United States Patent [19]

Bischof

[11] 4,433,974

[45] Feb. 28, 1984

[54] MIXING SYSTEM FOR PARENTERAL LIQUIDS

[75] Inventor: Reinhard Bischof, Baldham, Fed. Rep. of Germany

[73] Assignee: Baxter Travenol Laboratories, Inc., Deerfield, Ill.

[21] Appl. No.: 274,710

[22] Filed: Jun. 17, 1981

[51] Int. Cl.[3] .......................... G05D 9/00; A61J 1/00

[52] U.S. Cl. .................................. 604/407; 604/410; 604/416; 604/199

[58] Field of Search ............. 128/200.19, 272.1, 272.3, 128/DIG. 12, 214 F, DIG. 28, 214 G, 214.2, 128/214 R, 214 B, 273, 214 D, 278; 141/9, 104, 105, 141/27; 604/80, 81, 181, 183, 184, 186, 410–414; 222/383, 376; 73/863.33, 864.34, 863.83

[56] References Cited

U.S. PATENT DOCUMENTS

| | | | |
|---|---|---|---|
| 3,566,930 | 3/1971 | Kirschner | 128/214.2 |
| 3,650,093 | 3/1972 | Rosenberg | 128/214.2 |
| 3,963,026 | 6/1976 | Herb | 128/214 D |
| 3,965,897 | 6/1976 | Lundquist | 128/220 |
| 4,084,606 | 4/1978 | Mittleman | 128/274 |
| 4,114,617 | 9/1978 | Turner et al. | 128/214 G |
| 4,191,183 | 3/1980 | Mendelson | 128/214 R |

FOREIGN PATENT DOCUMENTS

| | | | |
|---|---|---|---|
| 2446643 | 9/1980 | France | 128/214 G |
| 1114247 | 5/1968 | United Kingdom | 128/214 R |

*Primary Examiner*—Henry J. Recla
*Attorney, Agent, or Firm*—Paul C. Flattery; John P. Kirby, Jr.; George H. Gerstman

[57] ABSTRACT

A system for the preparation of parenteral nutrient solutions from two or more substrates such as amino acids and carbohydrates in a virtually aseptic environment. A closed system is formed with the substrate supply containers, incorporating conduit extending from each supply container and connected to the inlet of a multiple transfer valve, a dosing syringe secured to the inlet/outlet connection of the transfer valve and a flexible mixing container secured to the outlet of the transfer valve. Each conduit includes a tube clamp such that each conduit is individually communicable with the transfer valve. With the suction stroke of the syringe plunger, fluid is drawn from one of the supply containers into the syringe. As the solution is ejected from the syringe it exits the outlet of the transfer valve and enters the mixing container. After a predetermined amount of the first substrate is added to the mixing container in this manner the tube clamp for the corresponding conduit is closed and the tube clamp on conduit extending to a second substrate supply container is opened, whereupon the process is repeated until the proper ratio of the substrates in the mixing container is achieved.

3 Claims, 3 Drawing Figures

MIXING SYSTEM FOR PARENTERAL LIQUIDS

TECHNICAL FIELD

This invention relates to the medical arts, and in particular, to a closed system for the production of parenteral nutrient solutions or the like with at least two supply containers for the substrates of the nutrient solution and a suction device, preferably a syringe, for the dosed take-up of the substrates from the supply containers.

BACKGROUND ART

The process previously used for the production of parenteral nutrient solutions is, especially in the area of pediatric intensive medicine, extremely laborious and subject to a high degree of contamination.

For each patient it is necessary for exactly dosed amounts of different substrates, such as, for example, amino acid, carbohydrate solutions and electrolytes to be mixed and administered. This is done predominately by taking up the individual substrates from the supply containers by means of a syringe, the contents of which are then administered by way of a perfusion pump at a constant dosage rate.

After emptying of the syringe the procedure described of taking up and administering is repeated, according to the requirements of the patient, as many as four to ten times daily. It is obvious that this process is highly subject to the introduction of infection. Dangerous sources of infection are the broached supply and infusion containers, which, provided with a cannula, may be left in this condition over a relatively long period of time, as well as possible contact contamination during the frequent manipulations. In this connection new-born babies are especially highly endangered in the infusion therapy described.

Underlying the present invention, therefore, is the problem of providing an arrangement for the production or preparation of parenteral nutrient and infusion solutions, in which the danger of contamination is at a minimum and which is further distinguished by a very simple procedure.

DISCLOSURE OF THE INVENTION

The problem described above is solved by the system according to the present invention, which includes a multiple valve provided with a nonreturn mechanism, known per se, having an inlet, an outlet and a connection active both as an inlet and also as an outlet to which a dosing syringe is connected. The outlet is fluid-connected to a mixing container and the inlet is fluid connected over individually blockable tube connections or the like to the supply containers, in such a way that the mixing container, syringe and supply containers together form a closed system.

The preparation of the nutrient solution or other mixed solution according to the invention is thus performed in the closed system, in the mixing container of which an entire daily dosage can be prepared. The system of the invention is, accordingly, largely free of contamination as well as substantially simpler to handle than the known process described at the outset. The procedure of both repeatedly mixing and administering by means of a syringe is eliminated in the system according to the invention.

The mixing container is simultaneously the administering container from which the nutrient solution to be infused is taken as needed by means of, for example, a constantly connected syringe. The mixing container is preferably constructed as a flexible bag of transparent plastic such as a Viaflex® solution container sold by Travenol Laboratories of Deerfield, Ill.

The supply containers may also be flexible bags of transparent plastic, being suspended for solution withdrawal preferably with their connections downward in a sterilization chamber.

With respect to the construction of the multiple valve used according to the invention, a fluid transfer valve is shown in U.S. Pat. No. 4,084,606, assigned to the present assignee, which is incorporated by reference in this application.

DETAILED DESCRIPTION

Figure 1:
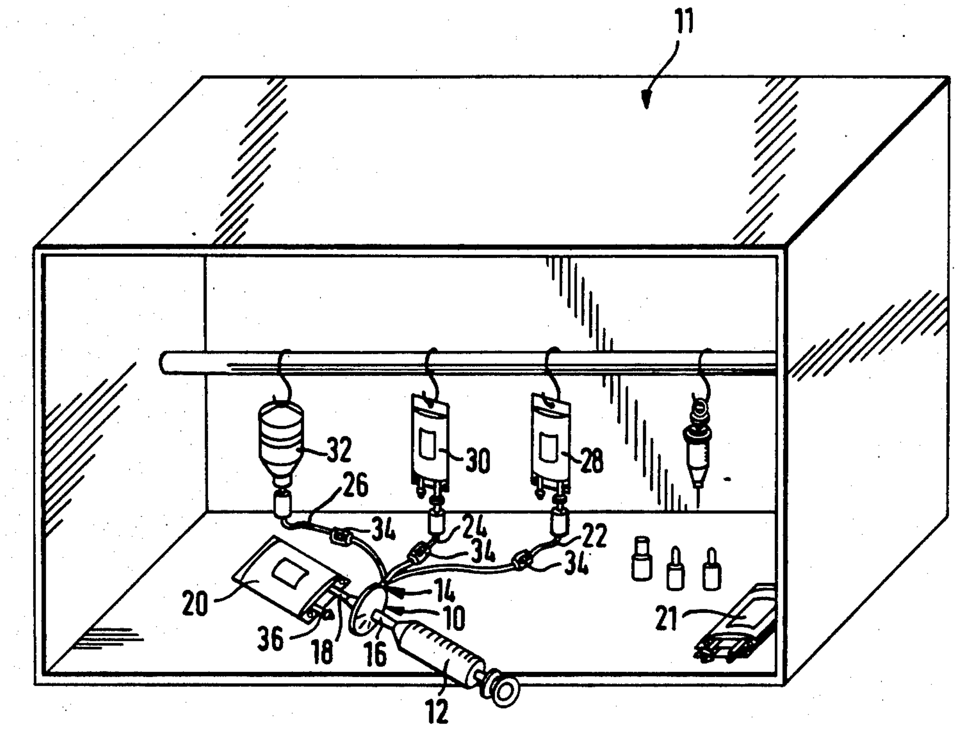
FIG. 1 is a perspective view of a closed system for the preparation of small-volume and medium-volume parenteral nutrient or infusion solutions according to the present invention.

Referring to the drawings, FIG. 1 comprises three supply containers 28, 30, 32 of, for example, amino acids, dextrose solution, carbohydrate solution, or the like. These supply containers are connected via conduits 22, 24, 26 such as administration tubing with an inlet 14 of a multiple valve 10. The conduits 22, 24, 26 are in each case individually blockable or clampable by means of tube clamps, preferably roller clamps 34. Each of the conduits 22, 24, 26 communicates with an inlet 14 of a multiple valve 10 by way of a connecting piece attached to the inlet 14. The multiple valve 10, which is described in detail in the above-mentioned U.S. Pat. No. 4,084,606, comprises, besides the inlet 14, an outlet 18 as well as an inlet/outlet connection 16 active both as an inlet and also as an outlet, to which there is connected a dosing syringe 12 or other suction means. Inside the multiple valve 10 there is arranged a so-called umbrella or screen nonreturn valve, which establishes a first fluid flow path between the inlet 14 and the connection 16 in a suction stroke of the dosing syringe 12 as well as a second fluid flow path between the connection 16 and the outlet 18 when the drawn-in fluid is again pressed out of the syringe 12. To the outlet 18 there is connected a mixing container 20 which is of such a size that it can accommodate one or two daily rations of an infusion solution. The supply and mixing containers are flexible bags of transparent plastic. The entire system is located inside a sterilization chamber 11 or within the sterilization zone, in order to further reduce the danger of contamination.

Figure 2:
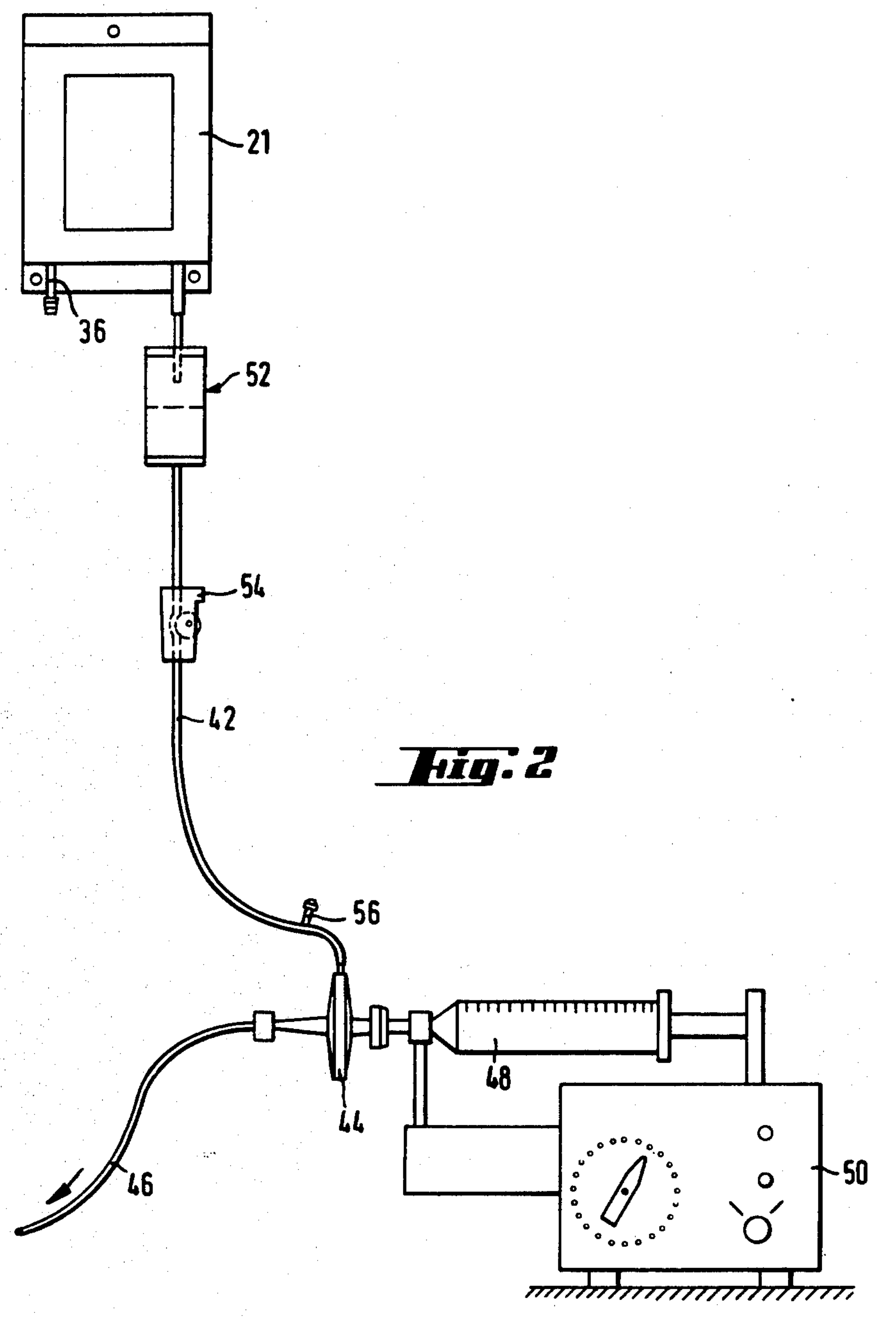
FIG. 2 is a front elevational view of an arrangement for administering a nutrient or infusion solution.

Shown in the right foreground of the sterilization chamber 11 is an already filled mixing bag 21. This filled mixing bag 21 is ready for the administering of the nutrient or infusion solution. The administration of the infusion solution may be made by means of an arrangement such as is shown in FIG. 2. The filled mixing bag 21 is suspended with its connection downward, the connection communicating through administration tubing 42 with the inlet of a second multiple valve 44 which may be of the same construction as multiple valve 10. To the outlet of the second multiple valve 44 there is connected a tube connection 46 leading to a patient, while to the connection active as inlet and outlet of the multiple valve 44 there is attached an administering syringe 48, the construction of which can be identical with that of the dosing syringe 12. The administering syring 48 is installed in a perfusion pump 50 that allows for a substantially constant dosage rate. One such pump is obtainable on the market under the trademark "Perfusor", sold by Braun Melsungen of West Germany. Alternatively, the administration of the nutrient or infusion solution from the mixing container may be made in the usual manner by gravity flow, without a pump 50.

In the administration tubing 42 there is further arranged a drop container 52 known per se. The administration tubing 42 is blockable or clampable by means of a roller clamp 54.

Additives to the nutrient solution which may be needed can be admixed through an injection site 56 extending from the administration tubing 42 upstream of the second multiple valve 44.

A completely closed mixing and administration system is obtained if onto a second connection 36 of the mixing container 20 there is connected the administration arrangement according to FIG. 2, while to the first connection the mixing arrangement according to FIG. 1 remains connected (not shown). This system, however, must be set up directly at the sickbed.

Figure 3:
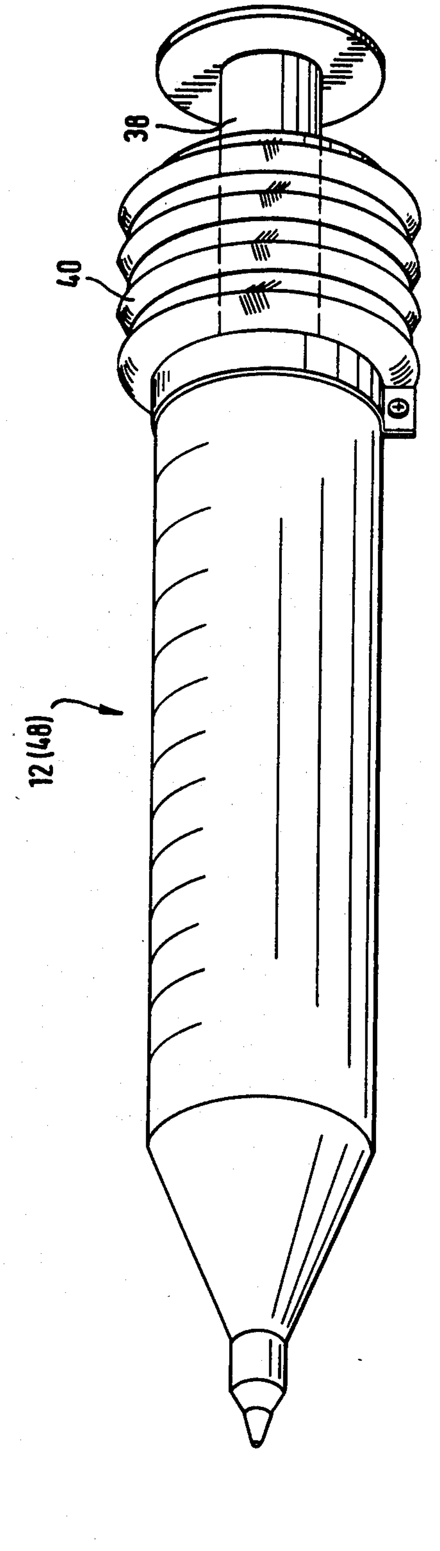
FIG. 3 is a perspective view of a dosing and administering syringe such as may be used in the system and the arrangement shown in FIGS. 1 and 2.

In FIG. 3 there is shown a construction promoting the solution of the problem posed by a dosing or administering syringe in which the outward extending part of the plunger rod 38 is covered by an elastic sleeve 40, preferably a rubber cuff, so that the plunger rod 38 has no contact with the environment. Penetration of bacteria from the plunger rod 38 into the interior of the syringe and into the nutrient or infusion solution is thereby avoided. Preferably inside the sleeve there is, in addition, an inert gas filling. The elastic sleeve 40 is secured to the cylinder of the syringe and to the plunger rod 38 by means of tube binders or equivalent fastening means.

What is claimed is:

1. A system for preparing parenteral liquid comprising:

at least a pair of supply containers;

at least a pair of conduits connected to and communicating with said respective supply containers each containing different substrates of parental liquid, each conduit having a tube clamp thereon for individually blocking the conduit to permit said substrates to be delivered separately through said conduits, a multiple valve including an outlet, an inlet/outlet connection, and an inlet to which is attached a connecting piece, said at least two conduits being attached to said connecting piece and communicating with said inlet;

said multiple valve creating a first flow path between said inlet and said inlet/outlet and a second flow path between said inlet/outlet and said outlet, a dosing syringe secured to said inlet/outlet connection for a predetermined suction of each of the substrates on a separate basis through said first flow path in a suction stroke of the syringe and for delivery to said outlet through said second flow path of the determined suction of the substrates in a delivery stroke of the syringe;

a flexible mixing container; and said flexible mixing container; communicating with said outlet; and receiving said separately delivered substrates for mixing;

wherein said system is closed.

2. The system as in claim 1, further comprising an elastic sleeve covering an outward extending part of a plunger rod of said dosing syringe, said elastic sleeve secured both to a cylinder of said dosing syringe and said plunger rod, whereby penetration of bacteria external of the dosing syringe into the interior of the syringe cylinder is avoided.

3. The system as in claim 1, further comprising supply containers having a flexible construction, a respective one of said containers being connected to said at least two conduits.

* * * * *